US006957802B2

(12) United States Patent
Fortino et al.

(10) Patent No.: US 6,957,802 B2
(45) Date of Patent: Oct. 25, 2005

(54) VALVE CLOSURE SYSTEM AND VALVE CLOSURE ASSEMBLY HAVING TORQUE LIMITING

(75) Inventors: Richard D. Fortino, Alma, MI (US); David N. Maniez, Jr., St. Louis, MI (US)

(73) Assignee: Powell Technologies LLC, St. Louis, MI (US)

( * ) Notice: Subject to any disclaimer, the term of this patent is extended or adjusted under 35 U.S.C. 154(b) by 0 days.

(21) Appl. No.: 10/418,691

(22) Filed: Apr. 18, 2003

(65) Prior Publication Data

US 2003/0197145 A1 Oct. 23, 2003

Related U.S. Application Data

(60) Provisional application No. 60/374,703, filed on Apr. 22, 2002, provisional application No. 60/374,653, filed on Apr. 22, 2002.

(51) Int. Cl.[7] ............................................. F16K 31/14
(52) U.S. Cl. ...................................................... 251/291
(58) Field of Search .............................. 251/291, 292, 251/293, 144; 137/270, 271, 347, 348, 350; 248/651–657

(56) References Cited

U.S. PATENT DOCUMENTS

| | | | | |
|---|---|---|---|---|
| 1,319,792 A | * | 10/1919 | Phorson ...................... 248/584 |
| 1,387,715 A | * | 8/1921 | Hickman ..................... 251/293 |
| 2,257,212 A | * | 9/1941 | Willoughby ................ 251/144 |
| 3,441,115 A | | 4/1969 | Gunther |
| 3,460,799 A | | 8/1969 | Sanctuary |
| 4,063,707 A | | 12/1977 | Zouzoulas |
| 4,065,094 A | | 12/1977 | Adams |
| 4,120,478 A | | 10/1978 | Hasegawa |
| 4,280,373 A | | 7/1981 | Denkowski et al. |
| 4,359,203 A | | 11/1982 | Cho |
| 4,380,325 A | | 4/1983 | Palmer |
| 4,527,715 A | | 7/1985 | Rosenbaum |
| 4,629,157 A | | 12/1986 | Tsuchiya et al. |
| 4,633,897 A | | 1/1987 | Effenberger |
| 4,637,423 A | | 1/1987 | Gray |
| 4,673,154 A | * | 6/1987 | Karapita ..................... 248/320 |
| 4,811,248 A | * | 3/1989 | Senoh et al. ................ 700/253 |
| 4,860,992 A | | 8/1989 | Aunspach |
| 4,872,482 A | | 10/1989 | Jarrett |
| 5,257,771 A | | 11/1993 | Portis et al. |
| 5,340,078 A | | 8/1994 | Dean |
| 5,381,996 A | * | 1/1995 | Arnemann et al. .... 251/129.12 |
| 5,588,637 A | | 12/1996 | Carsten et al. |
| 5,810,051 A | * | 9/1998 | Campagna et al. ......... 251/291 |

(Continued)

Primary Examiner—Eric Keasel
(74) Attorney, Agent, or Firm—George L. Boller

(57) ABSTRACT

A valve closure assembly (50) for remotely and automatically closing a railway tank car valve (V1, V2, V3, V4), characterized by improved convenience in mounting on a tank car dome (160) and adaptability to various dome geometries, valve configurations, and car-to-car dimensional variations. A clamp assembly (52) mounts assembly (50) on dome (160). An adapter (90) operated by a motor (58) acting through a torque limiter (88) turns a valve handle (A1, A2, A3, A4) when motor (58) runs. A positioning mechanism (54) selectively positions adapter (90) relative to clamp assembly (52) to establish a spatial relationship between them for enabling clamp assembly (52) to be placed at a desired location on the dome wall (162) and adapter (90) to engage a valve handle. Positioning mechanism (54) comprises three degrees of freedom of motion for establishing the spatial relationship of adapter (90) to clamp assembly (52), two of which are in the horizontal plane.

30 Claims, 15 Drawing Sheets

U.S. PATENT DOCUMENTS

| | | |
|---|---|---|
| 6,105,598 A | 8/2000 | Cabrera et al. |
| 6,170,801 B1 | 1/2001 | Powell et al. |
| 6,328,053 B1 | 12/2001 | Slaydon |
| 6,390,119 B1 * | 5/2002 | Crochet et al. ............. 137/347 |

* cited by examiner

VALVE CLOSURE SYSTEM AND VALVE CLOSURE ASSEMBLY HAVING TORQUE LIMITING

REFERENCE TO RELATED APPLICATIONS AND PRIORITY CLAIMS

This application derives from the following commonly owned patent applications, the priorities of which are expressly claimed: Provisional Application No. 60/374,703, filed on 22 Apr. 2002 in the names of Richard Fortino and David N. Maniez Jr. and Provisional Application No. 60/374,653, filed on 22 Apr. 2002 in the names of Richard Fortino and David N. Maniez Jr.

FIELD OF THE INVENTION

This invention relates to a valve closure system and valve closure assembly for promptly and automatically closing tank valves, especially tank valves of railway tank cars. The invention also relates to methods of making and using the valve closure assembly.

BACKGROUND OF THE INVENTION

Various fluids are transported by railway tank cars. Such tank cars have domes where various valves are located. The portions of the valves that are external to the tank, including the valve handles are housed within a protective housing that has a hinged lid or cover that is opened to expose the handles. One or more of the valves is opened during certain procedures involving loading and/or unloading fluid into and/or from the tank. During such procedures, a valve closure assembly having a power actuator is hoisted onto the dome and mounted there. The power actuator is fitted to the handle of the open valve and can be remotely and automatically operated to close the open valve when conditions call for valve closing.

SUMMARY OF THE INVENTION

The present invention relates to improvements in valve closure assemblies for remotely and automatically closing an open tank car valve when conditions call for valve closing. The inventive valve closure assembly is characterized by improved convenience in mounting and use on a railway tank car and by better adaptability to various types of protective housings and various tank car valve configurations within the housings. It is especially suited for valves that have soft seating. It is also tolerant of car-to-car variations in standard dimensions that are promulgated by industry for various valve configurations. The inventive principles include methods of making and using the valve closure assembly, and certain aspects of the invention may be useful in other than the context of a railway tank car.

One generic aspect of the invention relates to an assembly for turning an external handle of a tank dome valve about a vertical axis. The assembly comprises a mounting for removably mounting the assembly on a tank dome and an adapter operated by a motor acting through a torque limiter for engaging the valve handle and turning the handle when the motor operates the torque limiter. The assembly further comprises a positioning mechanism for selectively positioning the adapter relative to the mounting to establish a spatial relationship of each to the other for enabling the mounting to be placed at a desired location on the dome and the adapter to engage the valve handle. The positioning mechanism comprises two degrees of freedom of motion in a horizontal plane for establishing the spatial relationship of the adapter to the mounting in the horizontal plane.

Another generic aspect of the invention relates to an assembly for turning an external handle of a tank dome valve about a vertical axis where the assembly comprises a mounting for removably mounting the assembly on a tank dome, an adapter operated by a motor acting through a torque limiter for engaging the valve handle and turning the handle when the motor operates the torque limiter, and a positioning mechanism for selectively positioning the adapter relative to the mounting to establish a spatial relationship of each to the other for enabling the mounting to be placed at a desired location on the dome and the adapter to engage the valve handle. The positioning mechanism comprises three degrees of freedom of motion for establishing the spatial relationship of the adapter to the mounting.

Another generic aspect of the invention relates to a method of associating a valve operating assembly with a fluid-containing tank for enabling an adapter that is operated by a motor of the valve operating assembly acting through a torque limiter to turn an external handle of a valve on the tank about an axis of turning while a mounting of the assembly is supporting the assembly on the tank. The method comprises positioning the mounting relative to the torque limiter and adapter via a positioning mechanism of the valve operating assembly that has two degrees of freedom of motion in a plane of reference that is perpendicular to the axis of turning to establish a spatial relationship for placing the adapter in engagement with the valve handle and for placing the mounting at a desired location on the tank.

Another generic aspect of the invention relates to a method of associating a valve operating assembly with a fluid-containing tank for enabling an adapter operated by a motor of the valve operating assembly acting through a torque limiter to turn a valve on the tank about an axis of turning while a mounting of the assembly is supporting the assembly on the tank wherein the method comprises positioning the mounting relative to the torque limiter and adapter via a positioning mechanism of the valve operating assembly that has three degrees of freedom of motion to establish a spatial relationship for placing the adapter in engagement with the valve handle and for placing the mounting at a desired location on the tank.

Still another generic aspect of the invention relates to a method of associating a valve operating assembly comprising a mounting, a positioning mechanism, and an adapter operated by a motor acting through a torque limiter, with a dome of a fluid-containing tank comprising a valve having a handle that is external to the tank and an upright wall spaced horizontally from the valve handle for enabling the adapter to engage the valve handle and turn the handle about an axis of turning while the mounting is supporting the assembly at a desired location on the dome in horizontally spaced relation to the valve handle. The method comprises disposing the valve operating assembly vertically over the dome, lowering the assembly onto the dome, and causing the positioning mechanism to relatively position the torque limiter so as to place the adapter in engagement with the valve handle and to relatively position the mounting so as to place the mounting at a desired location on the upright wall.

The foregoing features, advantages, and aspects of the invention, along with additional ones, will be seen in the ensuing description and claims, which are accompanied by drawings. The drawings disclose a presently preferred embodiment of the invention according to the best mode contemplated at this time for carrying out the invention.

DESCRIPTION OF THE PREFERRED EMBODIMENT

Figure 1:
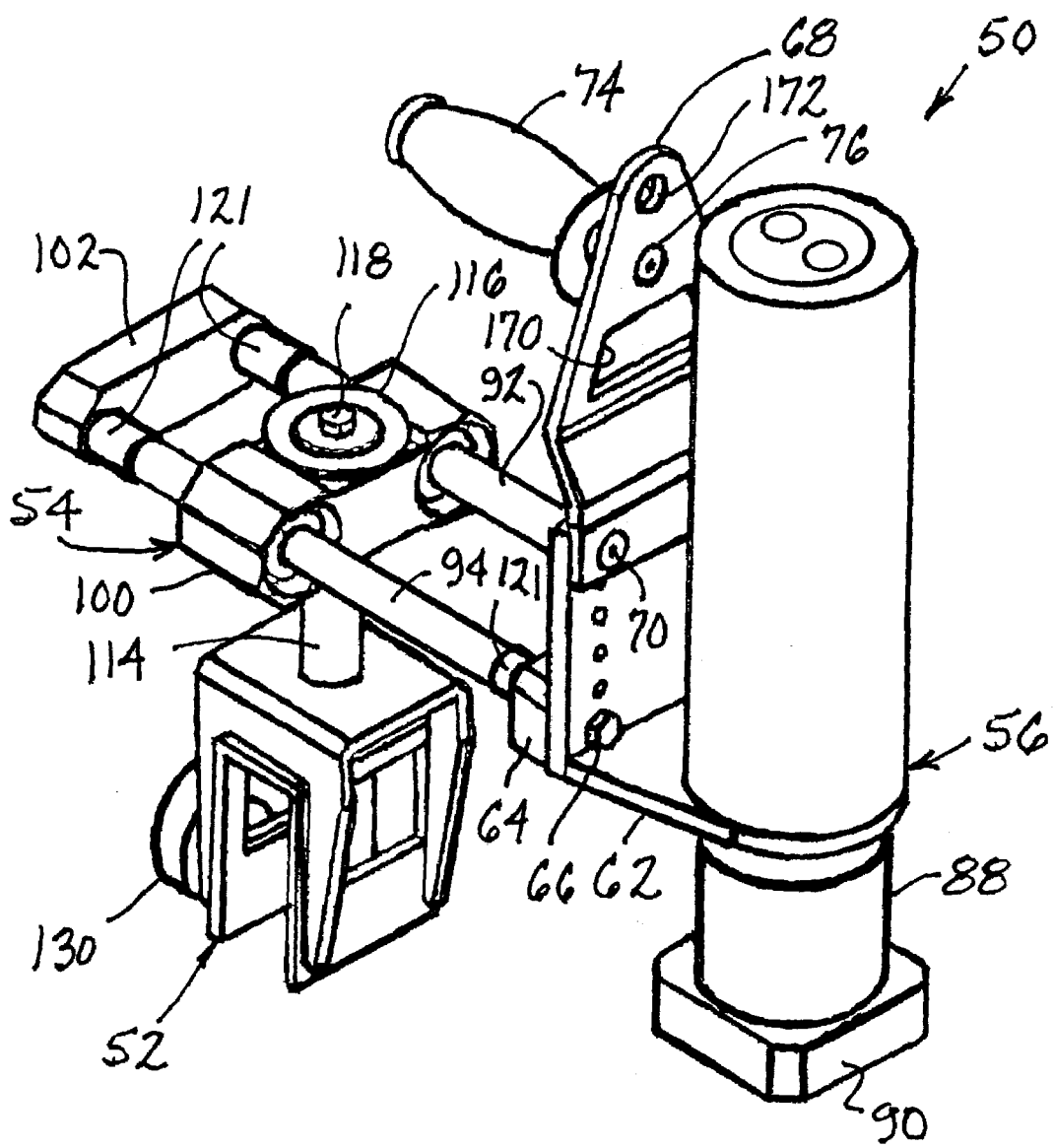
FIG. 1 is a perspective view showing a presently preferred embodiment of valve closure system comprising a valve closure assembly according to the present invention.
Figure 2:
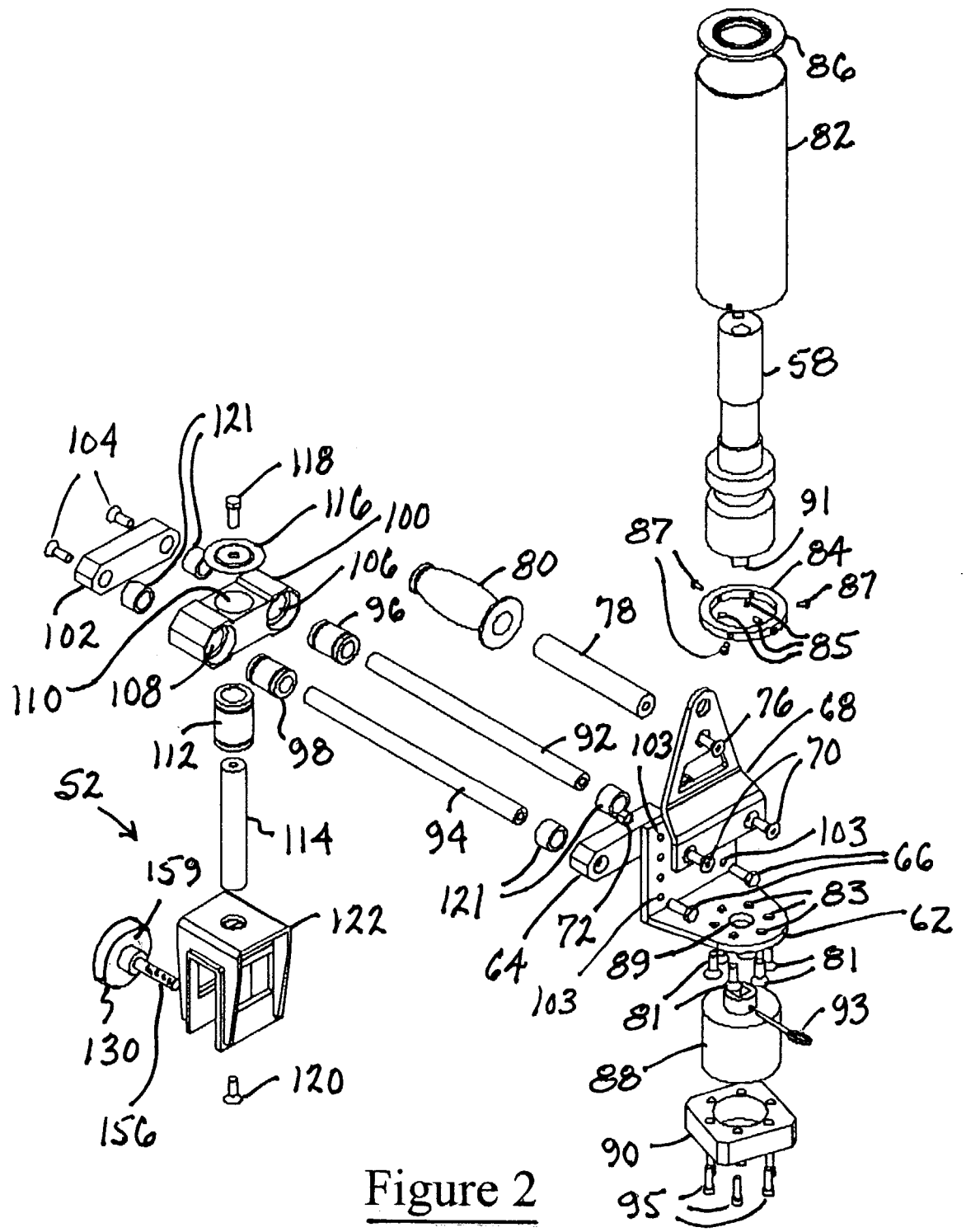
FIG. 2 is an exploded perspective view of FIG. 1.
Figure 3:
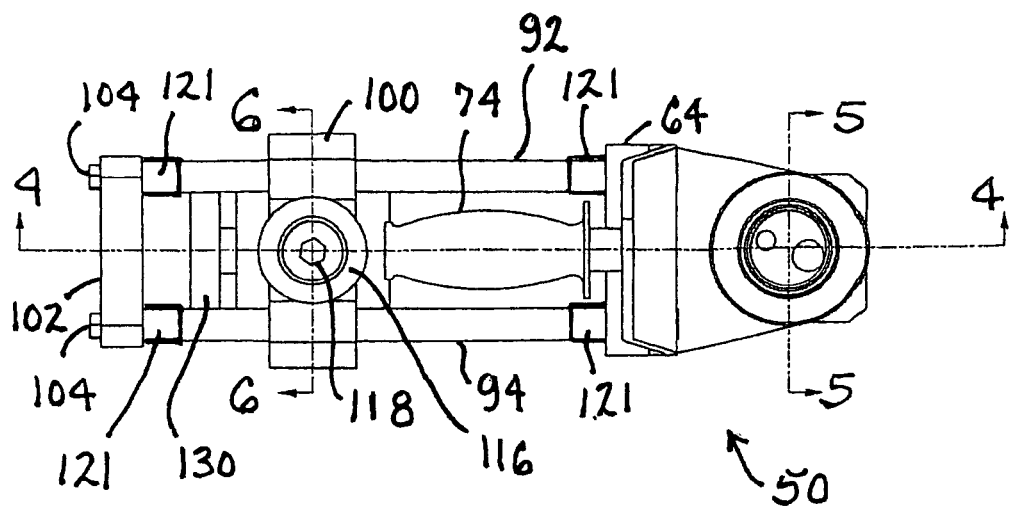
FIG. 3 is a top of plan view of FIG. 1.
Figure 4:
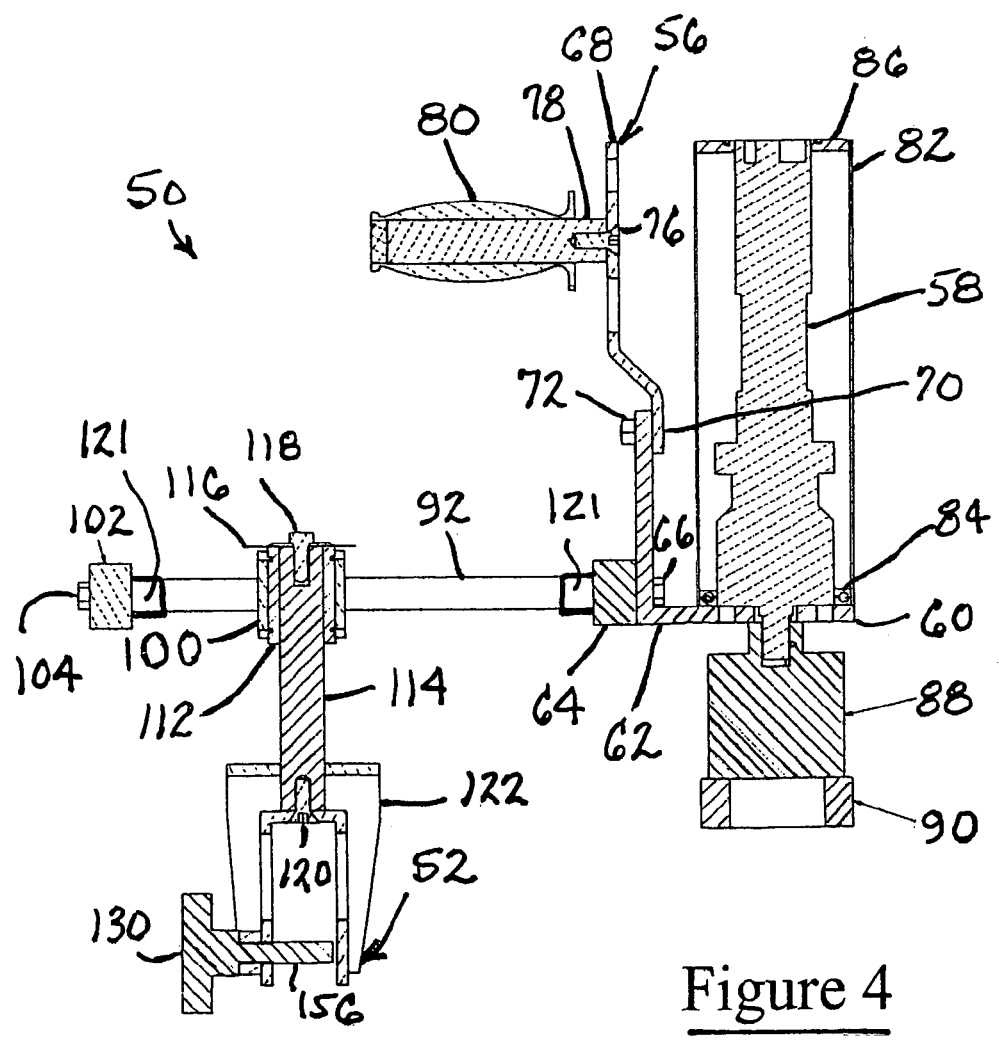
FIG. 4 is a vertical cross section view in the direction of arrows 4—4 in FIG. 3.
Figure 30:
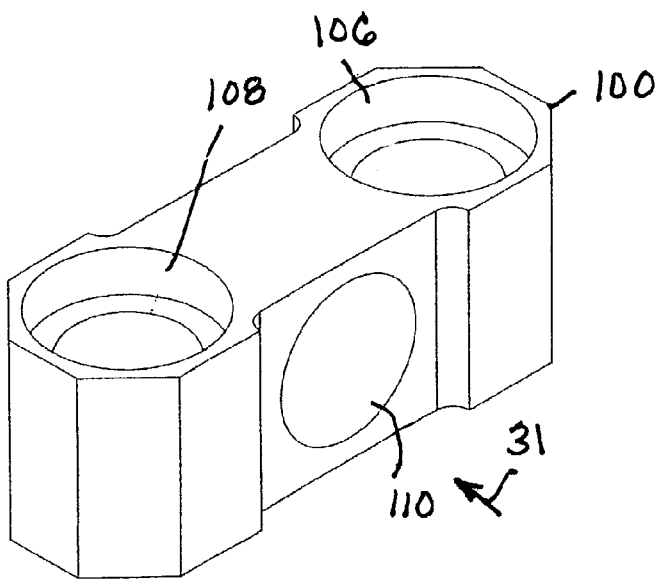
FIG. 30 is a perspective view of an element of a head positioning mechanism of the valve closure assembly by itself.
Figure 6:
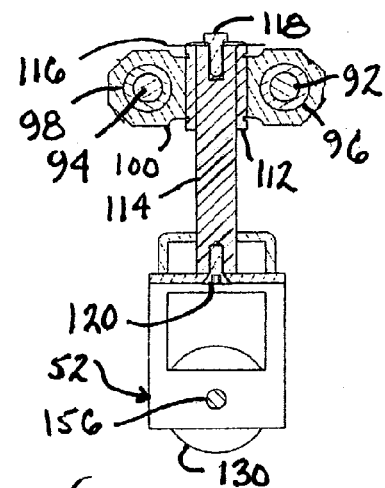
FIG. 6 is a vertical cross section view in the direction of arrows 6—6 in FIG. 3.
Figure 5:
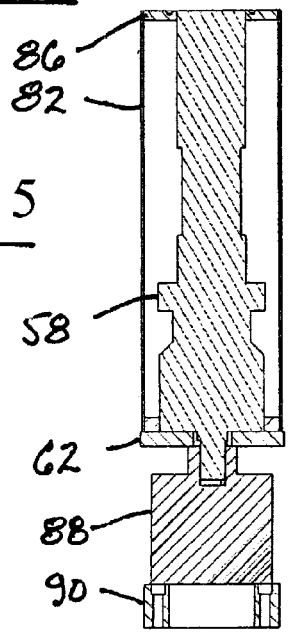
FIG. 5 is a vertical cross section view in the direction of arrows 5—5 in FIG. 3.
Figure 31:
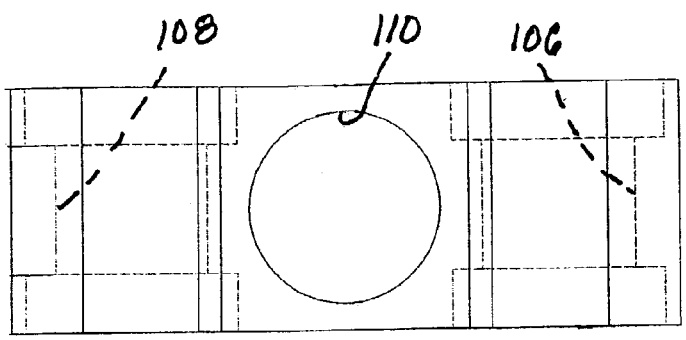
FIG. 31 is a view in the direction of arrow 31 in FIG. 30.
Figure 32:
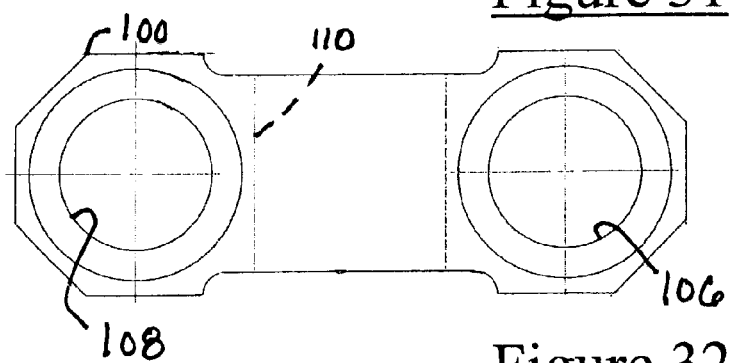
FIG. 32 is a bottom view of FIG. 31.
Figure 33:
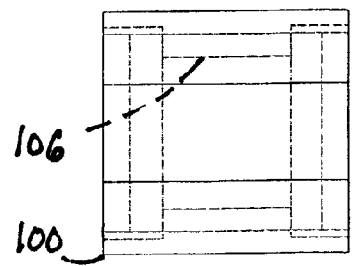
FIG. 33 is a right side view of FIG. 32.
Figure 10:
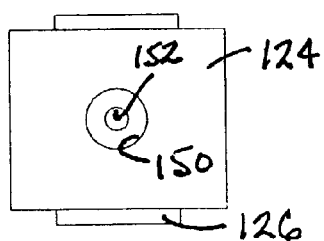
FIG. 10 is a top view of FIG. 9.
Figure 8:
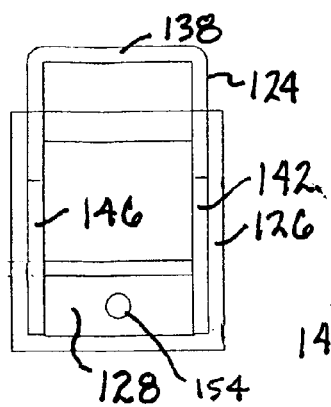
FIG. 8 is an elevation view in the direction of arrow 8 in FIG. 7.

FIGS. 1 through 6 illustrate a presently preferred embodiment of valve closure assembly 50 of a valve closure system in accordance with principles of the invention. The valve closure assembly is adapted for mounting on the dome of a railroad tank car and operative coupling with a handle of a valve on the tank car for enabling the valve to be automatically closed in a situation where immediate valve closure is called for.

The dome of a representative of railroad tank car comprises a protective housing. The protective housing comprises a circular upright wall that is supported on a manway cover. The manway cover is supported on a flange of a circular manway opening in the tank dome. That assembly carries various valves whose handles are disposed external to the tank interior, but within the interior of the protective housing. Piping for the valves extends through the manway cover into the tank interior. The open top of the circular upright wall of the protective housing is closed by a circular cover that can be opened to provide access to the interior of the protective housing, and hence to the valve handles. With the cover open, the rim of the circular wall is exposed.

The present invention utilizes the exposed rim of the circular wall of the protective housing for securely mounting valve closure assembly 50 on a tank car dome. Valve closure assembly 50 comprises a clamp assembly 52 for clamping on the rim of the circular wall of the protective housing, a positioning mechanism 54 that is supported on the clamp assembly, and a motor head 56 that is positioned by the positioning mechanism for operative association with a valve handle that will enable system 50 to promptly close the associated valve by turning the valve handle when called upon to do so. Clamp assembly 52 provides a mounting for removably mounting valve closure assembly 50 on the tank car dome.

Motor head 56 comprises a motor 58, preferably an air motor, that is mounted upright on a motor mounting 60. Mounting 60 comprises a base plate 62 that is shown by itself in detail in FIGS. 26 through 29. Mounting 60 is securely fastened to positioning mechanism 54 through a rectangular tie bar 64 using screws 66. A bracket 68 is fastened by fastening elements 70, 72 to base plate 62. A handle 74 is in turn fastened to bracket 68 by fasteners 76. Handle 74 comprises a handlebar 78 and a grip 80.

From this description it can be appreciated that mounting 60 comprises a horizontal platform on which motor 58 is securely mounted and a vertical wall that extends upward from that platform along side the motor. The horizontal portion of base plate 62 forms the horizontal platform of mounting 60, and the vertical portion of base plate 62 and bracket 68 together form the vertical wall of the mounting. Handle 74 extends horizontally away from the side of that vertical wall opposite motor 58 near the upper end of the motor.

The shank of a respective headed screw 81 passes through each of six holes 83 in base plate 62 to thread into a respective threaded hole in an end of the air motor body. Tightening of the screws secures motor 58 on motor mounting 60. It is considered desirable to protectively enclose motor 58 by a circular cylindrical shield 82. A circular ring 84 is disposed around the air motor body at one end and clamped to the air motor body using three set screws 85 that are threaded into tapped through-holes in ring 84. One end of shield 82 fits over ring 84 to establish concentricity of the shield to the motor body and contains several clearance holes that allow the shanks of headed screws 87 to pass through and thread into tapped holes in ring 84. These screws are tightened to secure the shield to the ring. An annular ring seal 86 closes the annular space between the shield and the motor body at the opposite end. The horizontal platform that base plate 62 provides to support motor 58 comprises a central through-hole 89 surrounded by the six holes 83. Through-hole 89 allows the motor shaft 91 to pass downward through the horizontal platform where an input of a torque limiter 88 is coupled to the shaft using a hitch pin 93. An adapter 90 is in turn fastened to the output of torque limiter 88 using screws 95. The upper end of motor 58 remains exposed to provide for connection of an air line (not shown) to the motor.

Positioning mechanism 54 comprises circular cylindrical rods 92, 94, linear bearings 96, 98, and a pillow block 100. Rods 92, 94 are disposed horizontally spaced apart in mutually parallel relationship. Tie bar 64 at one end of rods 92, 94 and a second tie bar 102 at the opposite ends of the rods have counterbored through-holes that allow the rod ends to fit with precision to the counterbores of the tie bars. Screws 66 pass through the clearance holes 103 of one of four pairs of such clearance holes in base plate 62 to enter the through-holes in tie bar 64 and thread into tapped holes in the rods. The uppermost pair of holes 103 are used for fastening bracket 68 to base plate 62, while the other three pairs provides for motor head 56 to be fastened to positioning mechanism 54 at any of three different elevations. Rods 92, 94 have tapped holes at their opposite ends, which seat with precision in the counterbores in the through-holes in tie bar 102. Screws 104 fasten tie bar 102 and the rods together at that end in the same way so that the assembly of the two tie bars and the two rods forms a part of the positioning mechanism that can translate horizontally relative to pillow block 100.

Detail of pillow block 100 is shown in FIGS. 30–33. Linear bearings 96, 98 are fit to respective through-holes 106, 108 in pillow block 100. Rods 92, 94 pass through these linear bearings to form a joint between the pillow block and rods. Midway between and at a right angle to through-holes 106,108, pillow block 100 comprises a vertical through-hole 110. A linear bearing 112 is fit to through-hole 110. A circular rod 114 forms an upright post that has tapped holes at opposite ends and passes through linear bearing 112 to form a joint between the post and pillow block. A stop disk 116 is fastened to the upper end of rod 114 using a screw 118. A screw 120 fastens clamp assembly 52 to the lower end of rod 114.

During the process of assembling positioning mechanism, tubular bumpers 121 are fit onto ends of rods 92, 94 proximate each tie bar 64, 102. Bumpers 121 limit the travel of pillow block 100 on rods 92, 94 so that the pillow block cannot strike either tie bar. The lengths of the bumpers are chosen to also provide sufficient clearance between the pillow block and the tie bars at the limits of pillow block travel so that pinch points are not present between the pillow block and the tie rods at the limits of pillow block travel.

FIGS. 7–22 show that clamp assembly 52 comprises a bracket assembly 122 fabricated from two base clamp parts 124, 126 and a strengthener plate 128. In addition to bracket assembly 122, clamp assembly 52 comprises a hand screw 130 that can be manually turned by a turning knob 159 shown in FIGS. 1–4 and 6.

Figure 17:
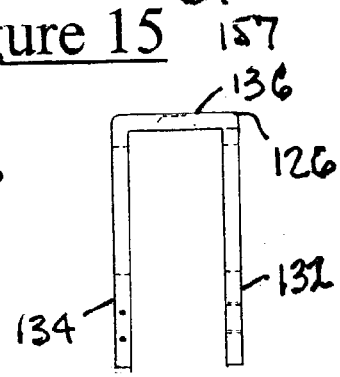
FIG. 17 is a right side elevation view of FIG. 16.
Figure 25:
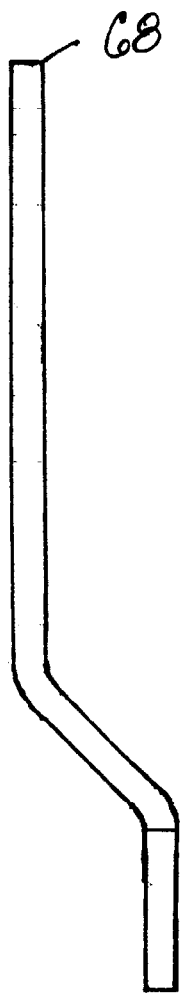
FIG. 25 is a left side elevation view of FIG. 24.
Figure 24:
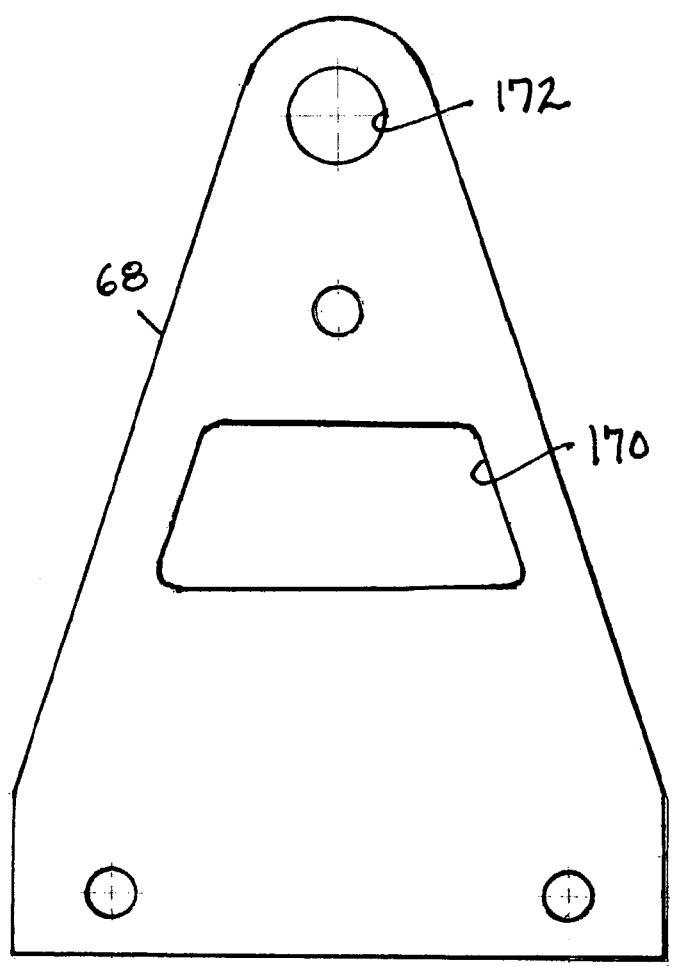
FIG. 24 is an elevation view in the direction of arrow 24 in FIG. 23.
Figure 28:
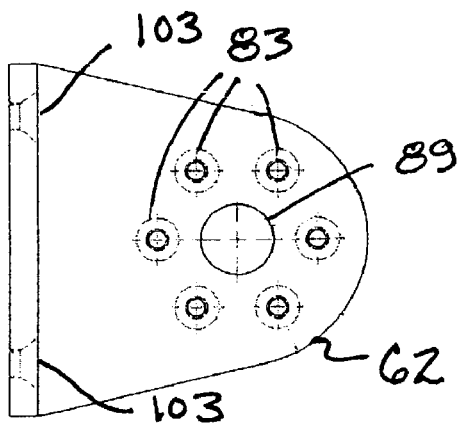
FIG. 28 is a top view of FIG. 27.
Figure 29:
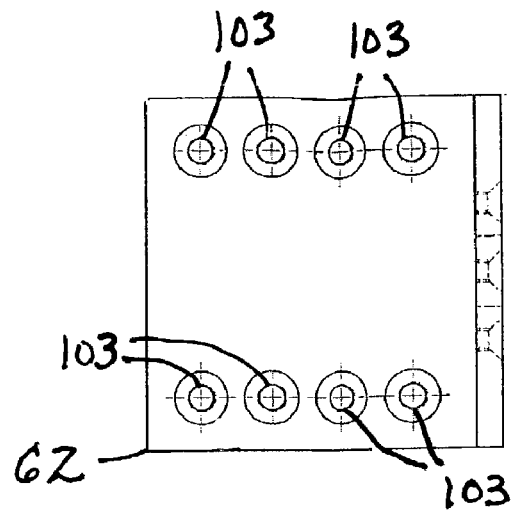
FIG. 29 is a right side view of FIG. 28.
Figure 27:
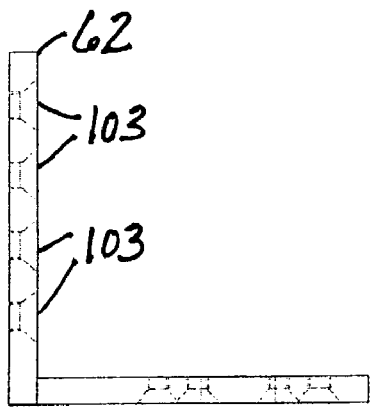
FIG. 27 is an elevation view in the direction of arrow 27 in FIG. 26.
Figure 26:
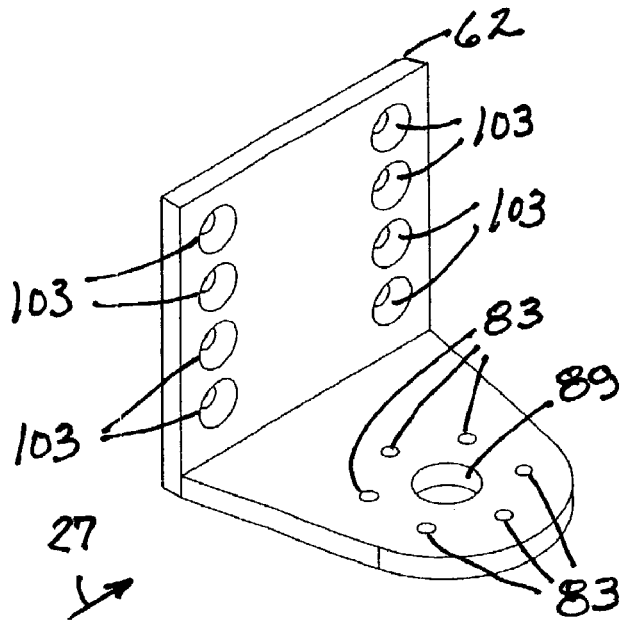
FIG. 26 is a perspective view of another element of the motor head by itself.
Figure 35:
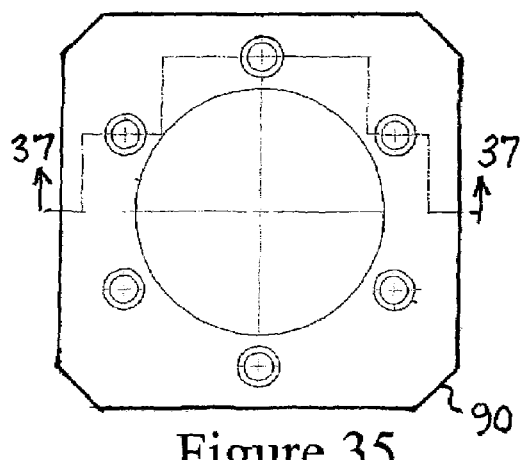
FIG. 35 is a view in the direction of arrow 35 in FIG. 34.
Figure 36:
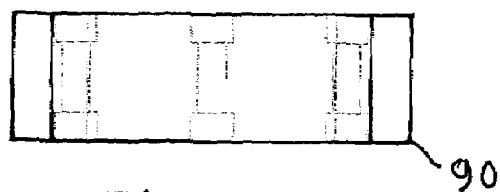
FIG. 36 is a bottom view of FIG. 31.
Figure 37:
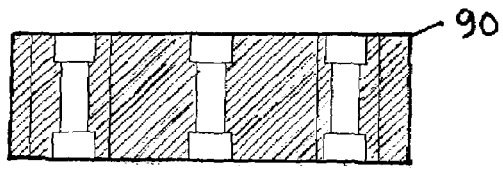
FIG. 37 is a cross section view taken in the direction of arrows 37—37 in FIG. 35.
Figure 34:
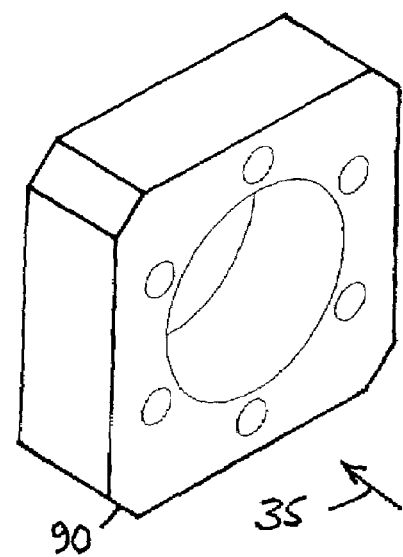
FIG. 34 is a perspective view of another element of the motor head by itself.
Figure 38:
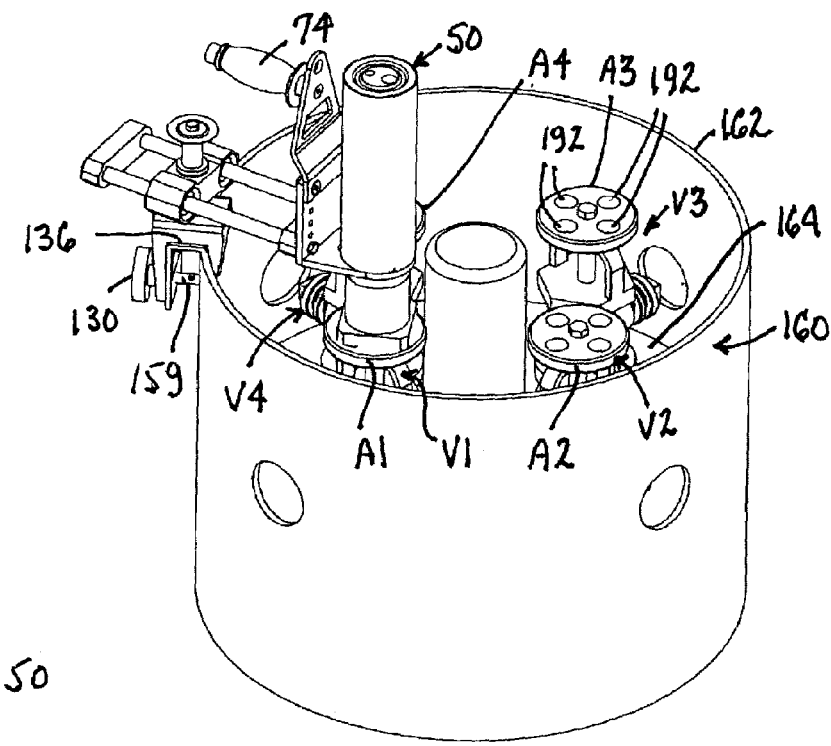
FIG. 38 is a perspective view of the valve closure assembly mounted on a railway tank car.
Figure 41:
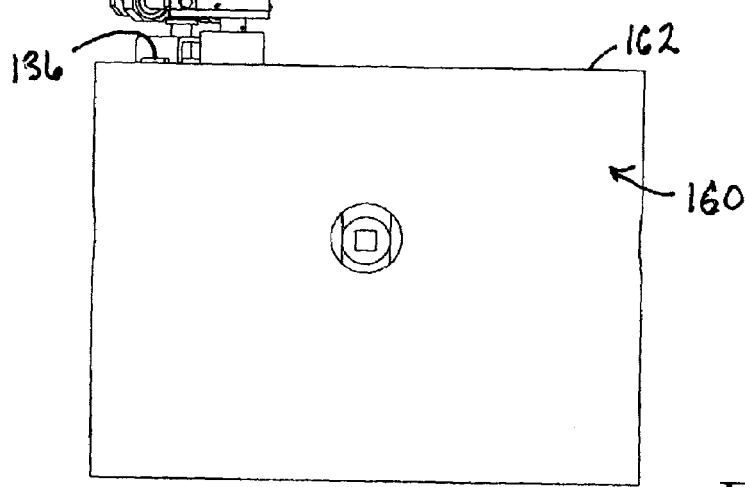
FIG. 41 is a right side elevation view of FIG. 40.
Figure 39:
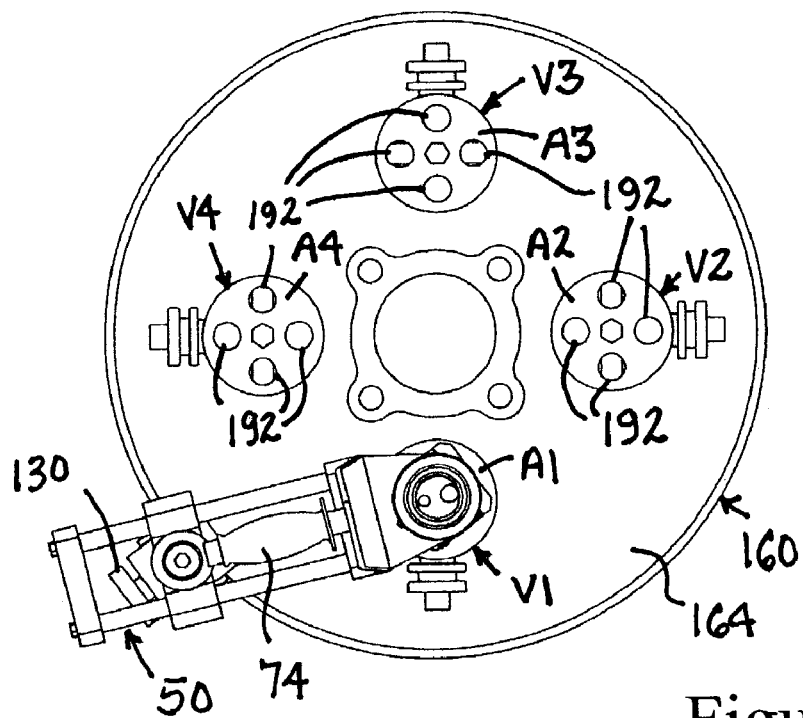
FIG. 39 is a top plan view of FIG. 38.
Figure 40:
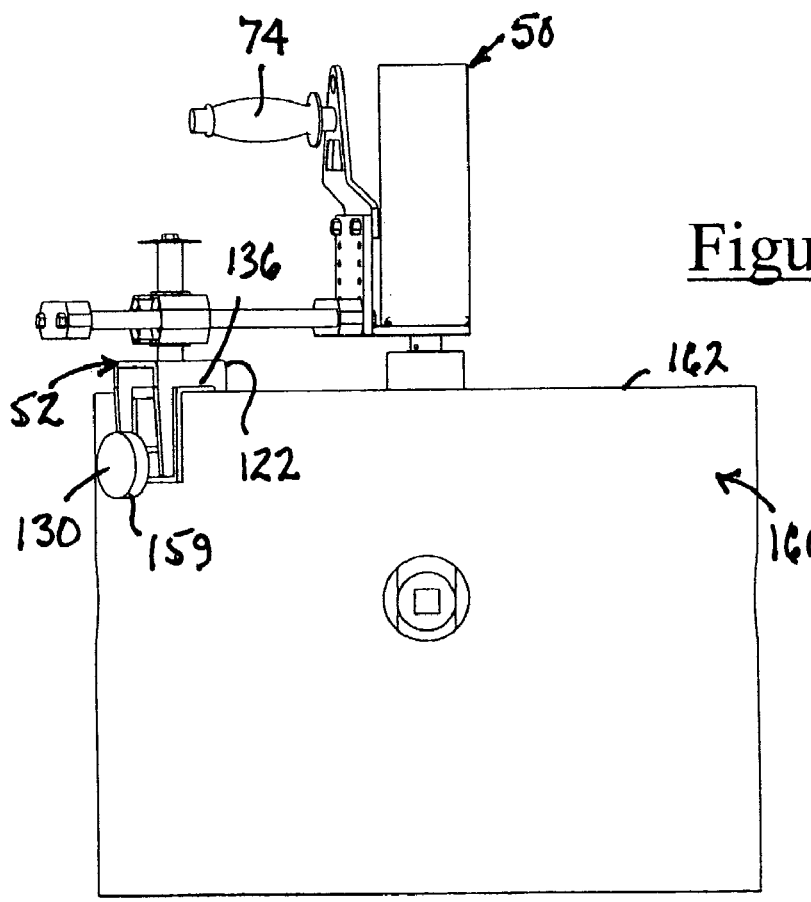
FIG. 40 is a front elevation view of FIG. 39.
Figure 42:
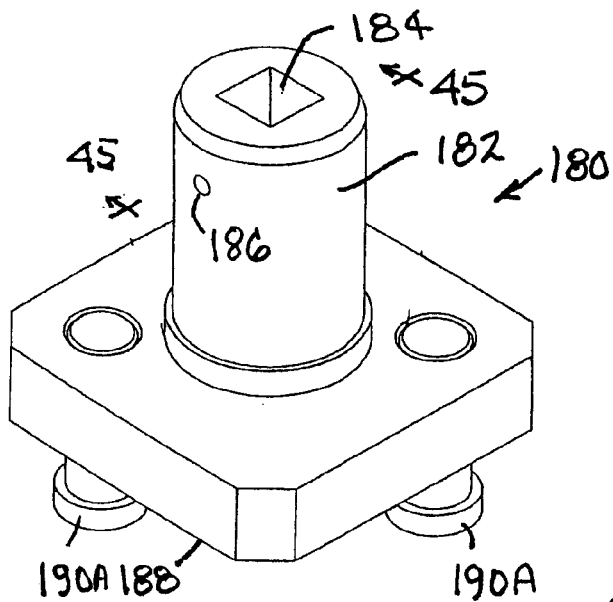
FIG. 42 is a perspective view of a direct drive adapter by itself.
Figure 43:
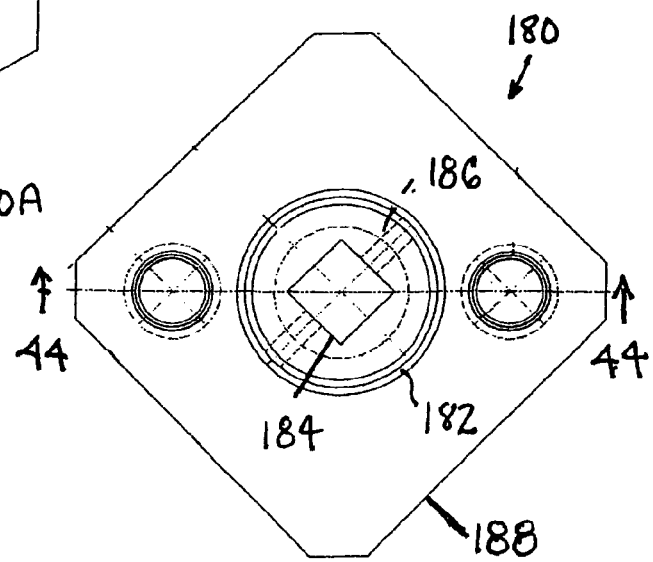
FIG. 43 is a top plan view of FIG. 42.
Figure 44:
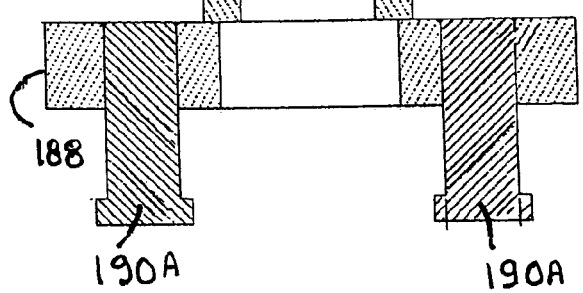
FIG. 44 is a vertical cross section view in the direction of arrows 44—44 in FIG. 43.
Figure 45:
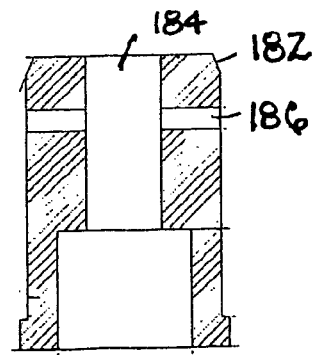
FIG. 45 is a cross section view in the direction of arrows 45—45 in FIG. 42.
Figure 46:
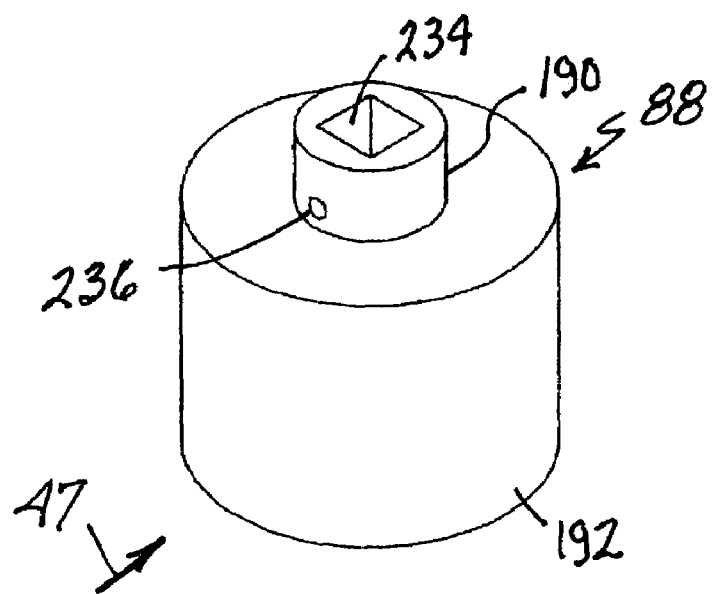
FIG. 46 is a perspective view showing a torque limiter suitable for use in the present invention.
Figure 47:
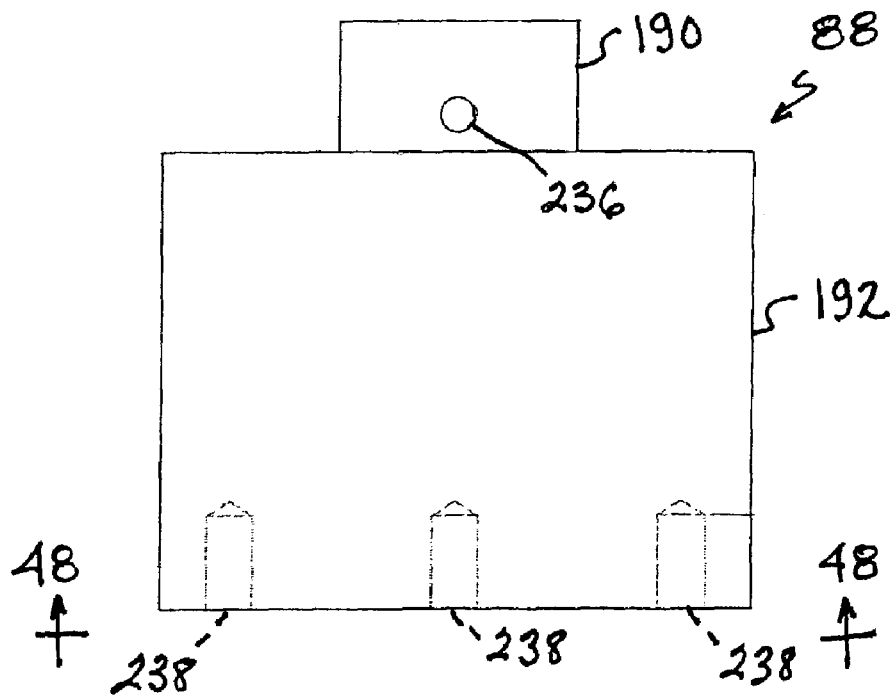
FIG. 47 is a front elevation view of the torque limiter in the direction of arrow 47 in FIG. 46.
Figure 48:
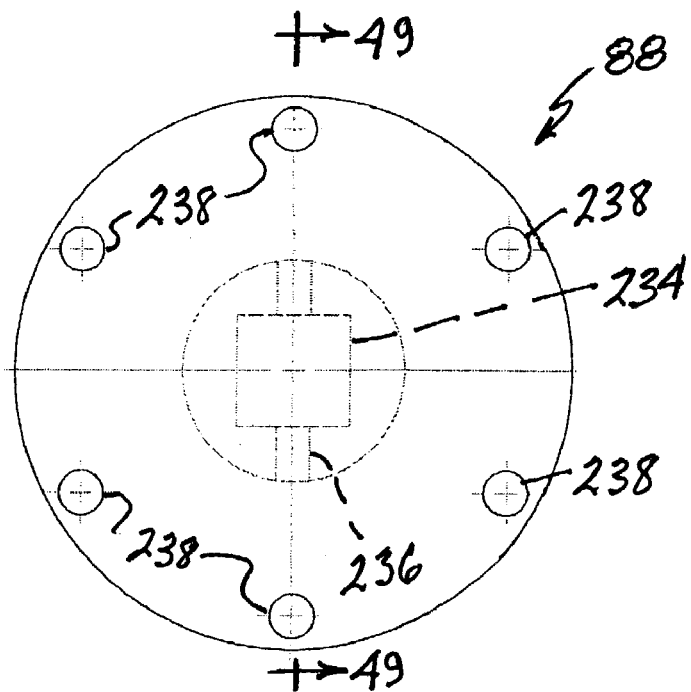
FIG. 48 is a bottom plan view in the direction of arrows 48—48 in FIG. 47.
Figure 49:
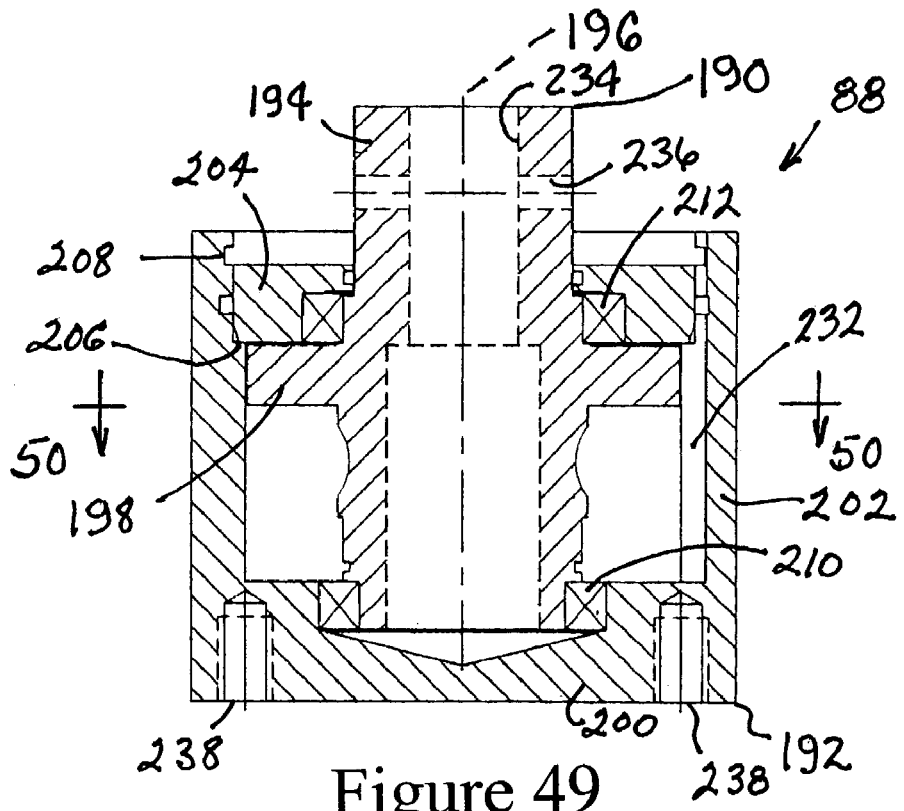
FIG. 49 is a vertical cross section view in the direction of arrows 49—49 in FIG. 48.

Part 126 is shaped to fit onto the rim of the protective housing of a railway tank car and comprises spaced apart vertical side walls 132, 134 that are joined by a horizontal top wall 136, endowing the part with an inverted U-shape as shown by FIG. 17. When the part is fit onto the protective housing rim, wall 132 is disposed inside the rim, wall 134 is disposed outside the rim, and top wall 136 rests on the top edge surface of the rim. Hence walls 132, 134 are spaced apart a distance that is greater than the thickness of the protective housing rim.

Figure 9:
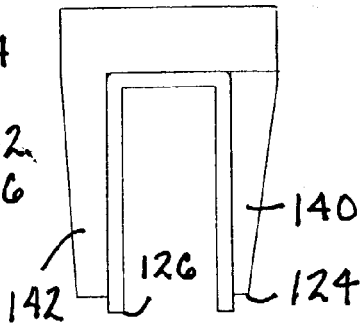
FIG. 9 is a right side elevation view of FIG. 8.
Figure 7:
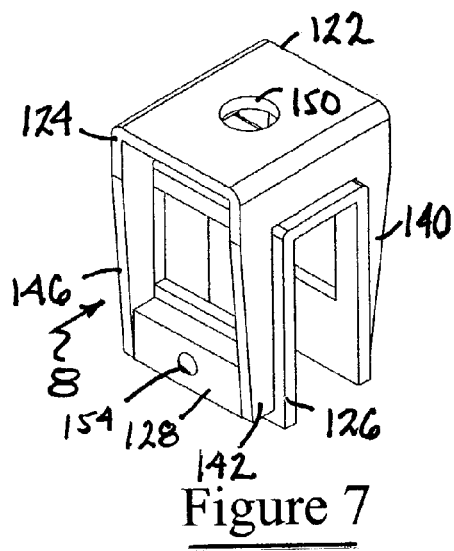
FIG. 7 is a perspective view of a clamp assembly of the valve closure assembly.
Figure 14:
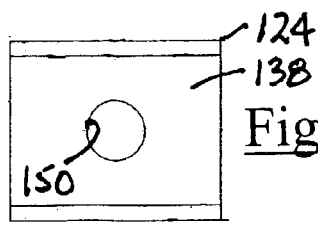
FIG. 14 is a top view of FIG. 12.
Figure 12:
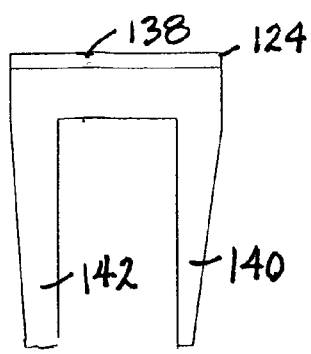
FIG. 12 is an elevation view in the direction of arrow 12 in FIG. 11.
Figure 13:
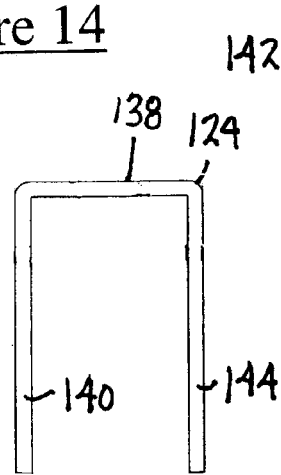
FIG. 13 is a right side elevation view of FIG. 12.
Figure 11:
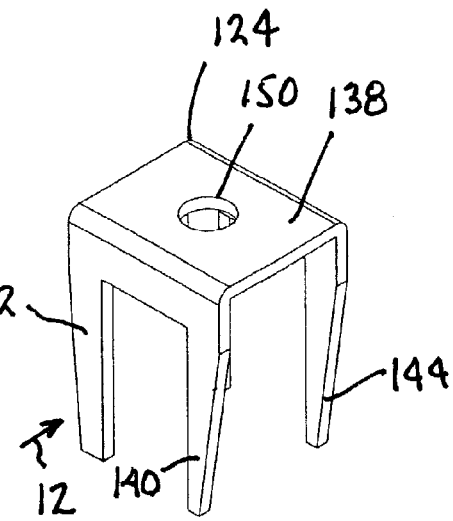
FIG. 11 is a perspective view of one element of the clamp assembly by itself.
Figure 23:
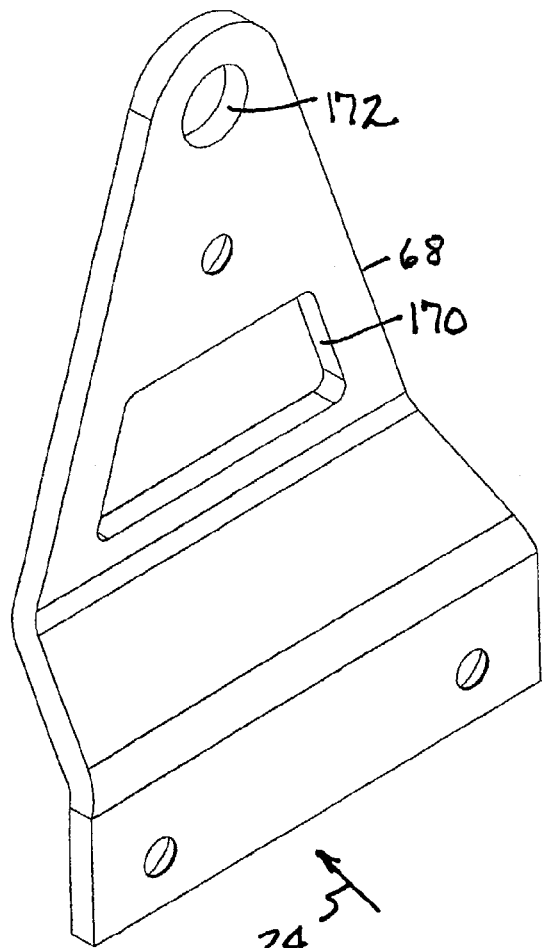
FIG. 23 is a perspective view of an element of a motor head of the valve closure assembly by itself.
Figure 19:
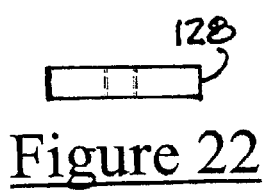
FIG. 19 is a perspective view of still another element of the clamp assembly by itself.
Figure 22:
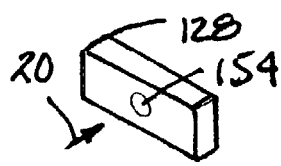
FIG. 22 is a top view of FIG. 20.
Figure 20:
FIG. 20 is an elevation view in the direction of arrow 20 in FIG. 19.
Figure 21:
FIG. 21 is a right side elevation view of FIG. 20.
Figure 18:
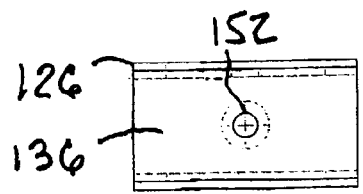
FIG. 18 is a top view of FIG. 16.
Figure 15:
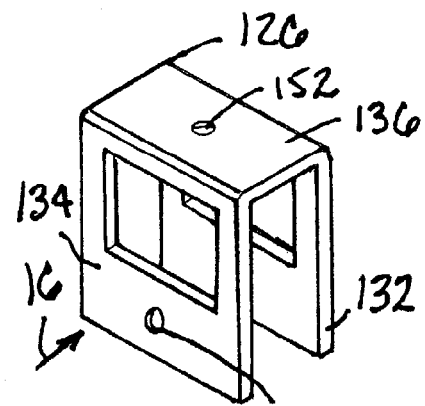
FIG. 15 is a perspective view of another element of the clamp assembly by itself.
Figure 16:
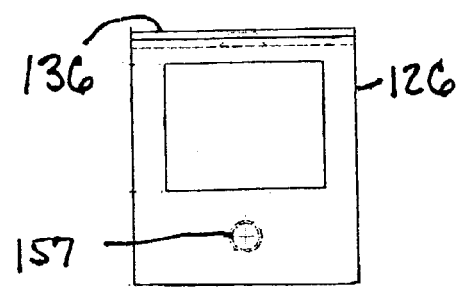
FIG. 16 is an elevation view in the direction of arrow 16 in FIG. 15.

Part 124 is shaped to nest on part 126 and comprises a horizontal rectangular top wall 138 and legs 140, 142, 144, 146 depending from the four corners of top wall 138. In the direction of the thickness of the protective housing rim, part 124 is longer than part 126, but part 124 is shorter than part 126 in a direction at 90° to the thickness of the protective housing rim. Between leg 140 and leg 142, part 124 has a downwardly open rectangular throat. A like throat exists between leg 144 and leg 146. The two throats are dimensioned so that part 124 fits snuggly onto part 126, as shown in FIGS. 7 and 9.

Strengthener plate 128 is rectangular in shape and is disposed against the outer surface of side wall 134 and between the lower ends of legs 142, 146. The three parts 124, 126, 128 are aluminum alloy and are joined together by any suitable metallurgical joining technique to form bracket assembly 122.

Top wall 138 has a circular hole 150 at its center that allows the lower end of rod 114 to pass through and abut top wall 136. The latter wall has a countersunk hole 152 for allowing the flat head of screw 120 to seat flush in the countersink. Because the two walls 136, 138 are spaced vertically apart and rod 114 has a close fit to hole 150, rod 114 is rigidly supported on clamp assembly 52. Rigidity may be enhanced by joining rod 114 to wall 138.

Strengthener plate 128 comprises a tapped hole 154 into which the threaded shank 156 of hand screw 130 is threaded. Side wall 134 may have a clearance hole 157 for shank 156, or it may provide an extension of the tapped hole in plate 128. Although the thickness of wall 134 may be sufficient for the forces that it will experience during use of the valve closure system, that thickness may be insufficient to provide the desired length for the tapped hole needed for hand screw 130. Strengthener plate 128 is therefore included to provide the desired tapped hole length into which shank 156 is threaded.

FIGS. 38–41 illustrate an example of how valve closure assembly 50 is used on a railway tank car. The tank car has a centrally located dome that has a protective housing 160. The protective housing comprises a circular upright side wall 162 on which a top cover (not shown) is hinged for opening and closing the housing. Side wall 162 is supported on a manway cover 164 that is part of an assembly that carries four valves V1, V2, V3, V4 in this example. The valves comprise respective handles A1, A2, A3, A4 that are disposed external to the tank interior, but within the interior of housing 160. With the top cover swung open, the rim of side wall 162 is exposed.

One or more of the valves is (are) opened, as appropriate to the particular procedure being performed on the tank car. A valve closure assembly 50 can be associated with the handle of any opened valve. The efficient geometry of valve closure assembly 50 allows multiple valve closure assemblies to be used concurrently. In this way a respective individual valve closure assembly 50 can be associated with a respective handle so that if all four valves are opened, they can be automatically closed by the respective valve closure assembly. The example shown in FIGS. 38–41 involves only a single valve closure assembly.

With hand screw 130 backed off sufficiently to provide a clearance from the distal end of shank 156 to side wall 132 of clamp assembly 52 that is sufficiently greater than the thickness of the rim of protective housing side wall 162, handle 74 can be grasped to position the valve closure assembly over protective housing 160 with bracket assembly 122 positioned over the housing side wall rim and the downwardly open throat of the bracket assembly aligned with the rim and with motor head 56 positioned over valve V1 and adapter 90 aligned with handle A1. The valve closure assembly is then lowered until top wall 136 of bracket assembly 122 comes to rest on the top edge surface of the housing side wall rim and adapter 90 comes into engagement with handle A1. Turning knob 159 of hand screw 130 is then grasped and turned to advance shank 156 against the outside of the housing rim thereby locking clamp assembly 52 to the protective cover. Other apparatus of the valve closure system that is not shown in the drawings is able to operate motor 58 when handle A1 is to be operated to close valve V1. During mounting of assembly 50 on a tank car, the linear bearings facilitate the ability of positioning mechanism 54 to achieve the desired positioning of motor head 56 relative to clamp assembly 52. They also facilitate any movement that may occur when motor 58 is operated, such as vertical motion arising from valve handle travel as the valve handle is turning. The linear bearings are commercially available products that incorporate circulating balls. Assembly 50 also adapts to a range of variations in valve location, a range in departure of a valve axis from vertical, and a range of thickness of the protective housing rim, without compromising the ability of the assembly to close an open valve.

Handle A1 has a shape that accepts the generally square shape of adapter 90 in a manner that allows the outer non-circular edge surface of the adapter to turn the handle. As motor 58 operates to turn the handle, the handle may or may not translate vertically as it is turning. The range of vertical travel of pillow block 100 on rod 114 and a proper vertical setting of motor head 56 on tie rod 64 will enable the motor head to travel vertically with the valve handle so that the driving relation of the adapter to the handle is maintained until the valve is fully closed.

Certain valves have "hard" seats while others have "soft" seats. Torque that is applied to close a valve that has a soft seat should not exceed a predetermined torque. Torque limiter 88 is therefore used in conjunction with valves that have soft seats to provide a low-torque drive. Where a valve has a hard seat, torque limiter 88 is disconnected from motor shaft 91 by extracting hitch pin 93 and lowering the torque limiter to disengage its input from the motor shaft. A direct drive adapter assembly is then connected to the motor shaft.

FIGS. 42–45 show one example of such a direct drive adapter 180. It comprises a cylindrical hub 182 with a square drive hole 184 for fitting onto motor shaft 91. A transverse hole 186 is arranged for registration with a hole in the motor shaft so that hitch pin 93 can pass through both holes to pin the adapter to the motor shaft. A base plate 188 at the end of hub 182 carries two drive pins 190A on the face of the base plate that is opposite hub 182. Drive pins 190A are arranged in a geometric pattern that allows them to fit into diametrically opposite holes 192 in the handles A2, A3, A4, of the other valves V2, V3, V4 in FIGS. 39 and 40 when assembly 50 is associated with one of them.

FIGS. 46–50 illustrate detail of torque limiter 88. The input of torque limiter 88 comprises an input member 190, and the output, an output member 192. Input member 190 comprises a cylindrical shaft 194 that is concentric with a vertical axis of rotation 196. Intermediate opposite ends of shaft 194, input member 190 comprises a circular flange 198. Output member 192 comprises an upwardly open cylindrical cup that is concentric with axis 196 and has a circular bottom wall 200 and a circular cylindrical side wall 202 extending vertically from bottom wall 200.

A lower portion of input member 190 that includes flange 198 is disposed within the interior of output member 192. A circular annular cover member 204 closes the open upper end of output member 192 just above flange 198 to capture input member 190 on output member 192. The outer margin of cover member 204 seats on an internal shoulder 206 in wall 202, and the cover member is retained by a retainer (not shown) that seats in a groove 208 that is present in wall 202 above shoulder 206 at a distance just greater than the thickness of cover member 204.

The face of bottom wall 200 that is toward the interior of output member 192 provides a mounting for a bearing assembly 210, and the lower face of cover member 204 provides a mounting for another bearing assembly 212. The bearing assemblies are concentric with axis 196 and provide a journal between the input and output members that allows them to turn relative to each other for torque limiting, as will become more apparent from further description.

A torque responsive mechanism 214 (shown in FIG. 50) is present within the interior of the torque limiter between cover member 204 and bottom wall 200 and in surrounding relationship to shaft 194. The mechanism comprises a pawl 216, two compression springs 218, 220, and three spring compressors 222, 224, 226.

Each spring compressor 222, 224, 226 has a radially inner face that is concave toward the outer surface of shaft 194, a radially outer face that is convex toward the inner surface of side wall 202, a flat upper end face that confronts the lower face of flange 198, and a flat lower end face that confronts the upper face of bottom wall 200 surrounding bearing assembly 210. Each spring compressor 222, 224, 226 spans a certain number of degrees about axis 196, having vertical side faces that are disposed substantially in planes that pass through axis 196. One end of spring 218 seats in the vertical side face of spring compressor 222 that is toward spring compressor 224 while the opposite end of spring 218 seats in the vertical side face of spring compressor 224 that is toward spring compressor 222. One end of spring 220 seats in the vertical side face of spring compressor 224 that is toward spring compressor 226 while the opposite end of spring 220 seats in the vertical side face of spring compressor 226 that is toward spring compressor 224.

Figure 50:
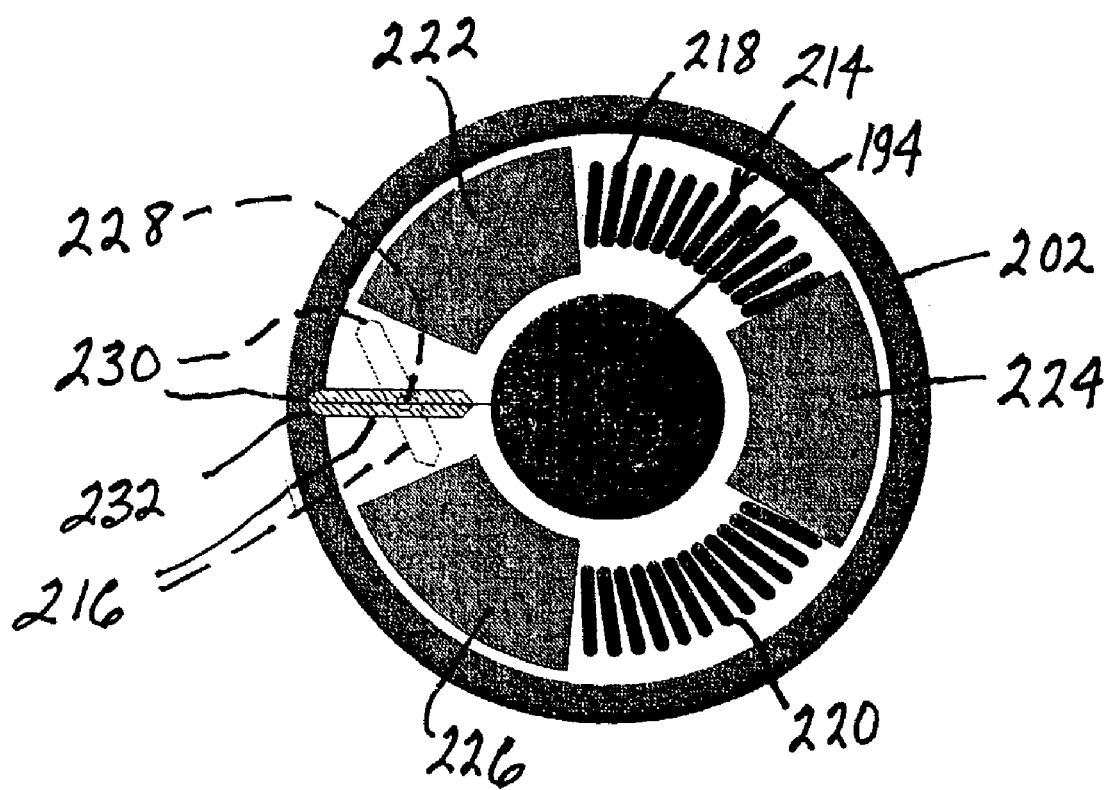
FIG. 50 is a horizontal cross section view in the direction of arrows 50—50 in FIG. 49, but rotated 180° in the plane of the Figure.

Pawl 216 is carried by input member 190, being pinned to flange 198 to pivot about an axis 228 that is parallel to and spaced from axis 196. Pawl 216 has a generally rectangular shape and interacts with output member 192 and spring compressors 222, 226 to connect and disconnect input member 190 to and from output member 192 depending on the torque load that is being imposed on output member 192. When the load is equal to or less than the maximum torque limit of torque limiter 88, a radially outer rounded edge 230 of pawl 216 that is parallel with axis 228 rides in a groove 232 in the inner surface of side wall 202 that is parallel with axis 196. The solid line position of pawl 216 shown in FIG. 50 is representative. When the load is greater than the maximum torque limit of torque limiter 88, pawl 216 has pivoted sufficiently about axis 228 to swing edge 230 out of groove 232, thereby disconnecting input member 190 from driving output member 192. The phantom line position of pawl 216 shown in FIG. 50 is representative of this condition.

When pawl 216 is fully radial to axis 194 as shown by the solid line position in FIG. 50, the vertical side faces of spring compressors 222, 226 are abutting opposite side faces of pawl 216, although it is to be appreciated that FIG. 50 doesn't specifically show that. Rather, FIG. 50 shows a condition where the turning of pawl 216 about axis 228 to the phantom line position has pushed spring compressors 222, 226 away from each other. That pushing has further compressed springs 218, 220 from the compression that they had when pawl 216 was fully radial to axis 194 and they were flat against opposite side faces of pawl 216.

With this background description of torque responsive mechanism 214, it can be appreciated that with input member 190 being turned to turn output member 192, a condition where there is no load torque on the latter member will cause pawl 216 to assume substantially the solid line condition shown in FIG. 50. As the torque load increases, output member 192 begins to pivot pawl 216. As pawl 216 pivots, its edge 230 will remain in groove 232 to keep input member 190 driving output member 192 until the torque load exceeds the maximum, at which point the pawl will have pivoted sufficiently to lose driving engagement with groove 232. As the pawl is pivoting, it is also forcing the confronting side faces of spring compressors 222, 226 farther apart, increasingly compressing springs 218, 220 in the process. Hence, the spring rates of the two springs in conjunction with the geometry of pawl and groove are instrumental in setting the maximum torque limit.

When the load torque returns below the maximum limit, the spring forces being exerted through spring compressors 222, 226 on pawl 216 will turn the pawl about axis 228 so that edge 230 can re-lodge in groove 232 when the edge arrives at the groove as the input member continues to rotate.

With torque limiter 88 attached to an air motor to close a soft seat valve, the torque limiter will prevent torques that are larger than the maximum torque limit from being applied to the valve handle, even when the motor is capable of delivering much greater torque. In that way, the same valve closure assembly can be used to close both hard and soft seat tank valves. When the valve closure assembly is mounted on a tank for closing a soft seat valve, the motor shaft is pinned to the torque limiter input, and an adapter that is fastened to the torque limiter output engages the valve handle. A known air motor has a shaft of square cross section that has a transverse through-hole of circular cross section. The portion of shaft 194 that protrudes upward from cover member 204 has a square drive hole 234 centered on axis 196. A transverse through-hole 236 passes through shaft 194, intersecting drive hole 234. Torque limiter 88 is coupled to the air motor shaft by fitting the motor shaft into hole 234 until its transverse through hole aligns with through-hole 236. A hitch pin (shown in FIG. 2) is then passed through the aligned holes. Use of a hitch pin for making the connection avoids the need to use a tool, an advantage in many situations involving railway tank cars.

For attaching certain adapters for closing certain soft seat valves to output member 192, a series of six tapped holes 238 equally spaced around the outer margin of bottom wall 200 are present. Each of those adapters has a similar through-hole pattern. When a face of such an adapter member is placed against wall 200 and the respective hole patterns are registered, the shanks of headed screws are passed through the adapter member through-holes and threaded into holes 238 and tightened. Such adapters cannot be coupled and pinned directly to the square motor shaft, and so they cannot be used to close a valve without the use of the torque limiter.

In addition to soft seat adapter 90, further examples of such adapters are disclosed in commonly owned, non-provisional patent application of the same inventors, "Adapters And Adapter Systems For Valve Closure Systems And Valve Closure Assemblies", Ser. No. 10/418,786, of even date, (Attorney Docket Powell0509).

An adapter for closing a hard seat valve, such as adapter 180, has a square drive hole that allows it to be fit over and pinned directly to the motor shaft. It will fit to the handles of certain hard seat tank valves, but not to the handles of certain soft seat tank valves. The input of the torque limiter has a similar configuration that allows it to be pinned directly to the motor shaft, but the adapters that are used with it have configurations that preclude that possibility because they can attach only to the output of the torque limiter. These diverse means of attachment preclude the possibilities that for the particular valves involved, the torque limiter will be used to close a hard seat valve and that a soft seat valve will be closed without a torque limiter.

Further examples of adapters for closing various hard seat valves are also disclosed in the above-referenced patent application of even date.

Because positioning mechanism 54 also endows the valve closure assembly with the ability to position motor head 56 at various horizontal distances from vertical rod 114, it becomes possible to mount clamp assembly 52 within a range of locations around the rim of the protective housing with respect to a particular valve. This can be an aid to mounting of a valve closure assembly, particularly when multiple valve closure assemblies are used on a single tank car.

Positioning mechanism 54 is therefore capable of selectively positioning torque limiter 88 and adapter 90 relative to the clamp assembly 52 to establish a spatial relationship of each to the other for enabling the clamp assembly to be placed at a desired location on dome wall 162 and the adapter to engage a valve handle. Positioning mechanism 54 comprises three degrees of freedom of motion for establishing the spatial relationship of the adapter to the mounting of assembly 50 on wall 162 that is provided by clamp assembly 52.

Two of those degrees of freedom of motion are in a horizontal plane of reference. They are provided as circular along a horizontal arc by the ability of pillow block 100 to turn on rod 114 about the vertical rod axis and as linear translation of rods 92 horizontally on pillow block 100. The third degree of freedom of motion is provided by the ability of pillow block 100 to travel vertically on rod 114.

Overall weight is reduced by using aluminum as the material of a number of the individual parts, such as clamp parts 124, 126, 128 and motor mount parts 62, 68. An optional trapezoidal hole 170 in the upwardly pointing tongue of bracket 68 lightens its weight. Certain individuals will be able to carry a valve closure assembly 50 by grasping handle 74, and able to install it on a tank car without help. A hole 172 near the tip end of the tongue of bracket 68 is available for attachment of an end of a lift or winch cable that can be used as an aid in lifting the valve closure assembly. Rectangular holes in side walls 132, 134 of bracket part 126 can lighten its weight.

While a presently preferred embodiment of the invention has been illustrated and described, it should be appreciated that principles of the invention are applicable to all embodiments that fall within the scope of the claims that follow hereinafter.

What is claimed is:

1. An assembly for turning an external handle of a tank dome valve about a vertical axis, the assembly comprising:
    a mounting for removably mounting the assembly on a tank dome,
    an adapter operated by a motor acting through a torque limiter for engaging the valve handle and turning the handle when the motor operates the torque limiter, and
    a positioning mechanism for selectively positioning the adapter relative to the mounting to establish a spatial relationship of each to the other for enabling the mounting to be placed at a desired location on the dome and the adapter to engage the valve handle, wherein the positioning mechanism comprises two degrees of freedom of motion in a horizontal plane for establishing the spatial relationship of the adapter to the mounting in the horizontal plane.

2. An assembly as set forth in claim 1 in which the mounting comprises a clamping mechanism for fitting and clamping onto a rim of an upright wall of the dome bounding a zone of the dome containing the valve.

3. An assembly as set forth in claim 2 in which the positioning mechanism comprises a first part supported on the clamping mechanism and a second part that comprises an association with the first part for providing the positioning mechanism with a first of the two degrees of freedom of motion that extends along a circular arc centered on the first part.

4. An assembly as set forth in claim 3 in which the first part comprises an upright post on the clamping mechanism and the association of the second part with the first part comprises a joint that allows the second part to turn on the post about a vertical axis of the post for causing the first degree of freedom of motion to extend along a horizontal circular arc centered on the vertical axis.

5. An assembly as set forth in claim 4 in which the joint comprises a linear bearing between the post and the second part to allow the second part not only to turn on the post about the vertical axis of the post but also to be positioned vertically along the post.

6. An assembly as set forth in claim 5 in which the positioning mechanism further comprises a third part that comprises an association with the second part for providing the positioning mechanism with a second of the two degrees of freedom of motion.

7. An assembly as set forth in claim 6 in which the association of the third part with the second part comprises a joint through which the third part is supported on the second part and which provides for selective positioning of the third part relative to the second part along a horizontal linear axis.

8. An assembly as set forth in claim 7 in which the second part comprises a central zone having a vertical through-hole in which the bearing is disposed and zones at either lateral side of the central zone each having a respective horizontal through-hole containing a respective linear bearing, and the third part comprises rods received in the linear bearings in the horizontal through-holes.

9. An assembly as set forth in claim 8 in which the motor is mounted on a horizontal platform of a bracket that is attached to a bar that ties together ends of portions of the rods that extend from one longitudinal end of the second part, the bracket comprises a vertical wall extending upright from the platform and disposed between the motor and the second part, and the assembly further includes a handle for lifting the assembly attached to the vertical wall in vertically spaced relation to the horizontal platform and extending transversely of the vertical wall in a direction away from the motor.

10. An assembly as set forth in claim 9 in which the motor comprises an air motor having an output shaft that turns about a vertical axis and that protrudes through an aperture in the horizontal platform to extend below the horizontal platform, and the torque limiter attaches to the output shaft below the horizontal platform.

11. An assembly as set forth in claim 9 including another bar that ties together ends of portions of the rods that extend from a longitudinal end of the second part opposite the one longitudinal end, and bumpers disposed between each bar and the second part for preventing either bar from hitting the second part.

12. An assembly as set forth in claim 3 in which the positioning mechanism further comprises a third part that comprises an association with the second part for providing the positioning mechanism with a second of the two degrees of freedom of motion, and the association of the third part with the second part comprises a joint through which the third part is supported on the second part and which provides for selective positioning of the third part relative to the second part along a horizontal linear axis.

13. An assembly as set forth in claim 1 in which the positioning mechanism comprises a first part supported on the mounting, a second part that comprises an association with the first part for providing the positioning mechanism with a first of the two degrees of freedom of motion, and a third part that comprises an association with the second part for providing the positioning mechanism with a second of the two degrees of freedom of motion.

14. An assembly as set forth in claim 13 in which the association of the second part with the first part comprises a joint that allows the second part to be selectively positioned on the first part along a circular arc centered on the first part.

15. An assembly as set forth in claim 14 in which the joint that allows the second part to be selectively positioned on the first part along a circular arc centered on the first part comprises a joint that allows the second part to be selectively positioned on the first part along a horizontal circular arc centered on the first part.

16. An assembly as set forth in claim 15 in which the association of the third part with the second part comprises a joint through which the third part is supported on the second part and which provides for selective positioning of the third part relative to the second part along a linear axis.

17. An assembly as set forth in claim 16 in which the first part comprises an upright post on the mounting, and the joint that allows the second part to be selectively positioned on the first part along a horizontal circular arc comprises a joint that allows the second part both to turn on the post as it is selectively positioned along the circular horizontal arc centered on the vertical axis and also to be positioned vertically along the post.

18. An assembly as set forth in claim 13 in which the association of the third part with the second part comprises a joint through which the third part is supported on the second part and which provides for selective positioning of the third part relative to the second part along a linear axis.

19. An assembly as set forth in claim 18 in which the joint through which the third part is supported on the second part and which provides for selective positioning of the third part relative to the second part along a linear axis comprises a joint that provides for selective positioning of the third part relative to the second part along a horizontal linear axis.

20. An assembly as set forth in claim 1 in which one of the degrees of freedom of motion describes a circular arc in the horizontal plane and the other of the degrees of freedom of motion describes a straight line in the horizontal plane.

21. An assembly for turning an external handle of a tank dome valve about a vertical axis, the assembly comprising:
   a mounting for removably mounting the assembly on a tank dome,
   an adapter operated by a motor acting through a torque limiter for engaging the valve handle and turning the handle when the motor operates the torque limiter, and
   a positioning mechanism for selectively positioning the adapter relative to the mounting to establish a spatial relationship of each to the other for enabling the mounting to be placed at a desired location on the dome and the adapter to engage the valve handle, wherein the positioning mechanism comprises three degrees of freedom of motion for establishing the spatial relationship of the adapter to the mounting.

22. An assembly as set forth in claim 21 in which two of the three degrees of freedom of motion establish that portion of the spatial relationship within a plane of reference, and the third degree of freedom of motion establishes that portion of the spatial relationship transverse to the plane of reference.

23. An assembly as set forth in claim 22 in which the plane of reference is a horizontal plane.

24. An assembly as set forth in claim 21 in which two of the three degrees of freedom of motion are along non-parallel straight lines, and the third degree of freedom of motion is along a circular arc.

25. An assembly as set forth in claim 24 in which one of the straight lines is vertical, and the other, horizontal.

26. An assembly as set forth in claim 24 in which the circular arc is centered on a vertical axis.

27. A method of associating a valve operating assembly with a fluid-containing tank for enabling an adapter that is operated by a motor of the valve operating assembly acting through a torque limiter to turn an external handle of a valve on the tank about an axis of turning while a mounting of the assembly is supporting the assembly on the tank, the method comprising:
   positioning the mounting relative to the torque limiter and adapter via a positioning mechanism of the valve operating assembly that has two degrees of freedom of motion in a plane of reference that is perpendicular to the axis of turning to establish a spatial relationship for placing the adapter in engagement with the valve handle and for placing the mounting at a desired location on the tank.

28. A method as set forth in claim 27 in which the positioning step comprises relatively positioning the mounting and the adapter via the positioning mechanism in a plane of reference that is horizontal.

29. A method of associating a valve operating assembly with a fluid-containing tank for enabling an adapter operated by a motor of the valve operating assembly acting through a torque limiter to turn a valve on the tank about an axis of turning while a mounting of the assembly is supporting the assembly on the tank, the method comprising:
   positioning the mounting relative to the torque limiter and adapter via a positioning mechanism of the valve operating assembly that has three degrees of freedom of motion to establish a spatial relationship for placing the adapter in engagement with the valve handle and for placing the mounting at a desired location on the tank.

30. A method of associating a valve operating assembly comprising a mounting, a positioning mechanism, and an adapter operated by a motor acting through a torque limiter, with a dome of a fluid-containing tank comprising a valve having a handle that is external to the tank and an upright wall spaced horizontally from the valve handle for enabling the adapter to engage the valve handle and turn the handle about an axis of turning while the mounting is supporting the assembly at a desired location on the dome in horizontally spaced relation to the valve handle, the method comprising:
   disposing the valve operating assembly vertically over the dome, lowering the assembly onto the dome, and causing the positioning mechanism to relatively position the torque limiter so as to place the adapter in engagement with the valve handle and to relatively position the mounting so as to place the mounting at a desired location on the upright wall.

* * * * *